United States Patent
Compton et al.

(10) Patent No.: US 8,295,005 B2
(45) Date of Patent: Oct. 23, 2012

(54) METHOD TO HANDLE PORTABLE CASSETTES REMOVEABLY DISPOSED IN A DATA STORAGE LIBRARY COMPRISING A PASS-THROUGH ACCESSOR

(75) Inventors: Matthew Charles Compton, Tucson, AZ (US); Louis Daniel Echevarria, Tucson, AZ (US); Stefan Lehmann, Tucson, AZ (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/542,408

(22) Filed: Aug. 17, 2009

(65) Prior Publication Data

US 2011/0038075 A1 Feb. 17, 2011

(51) Int. Cl.
*G11B 15/68* (2006.01)
(52) U.S. Cl. .................................... 360/92.1; 369/34.01
(58) Field of Classification Search .................. 360/92.1; 369/33.01–34.01
See application file for complete search history.

(56) References Cited

U.S. PATENT DOCUMENTS

| | | | |
|---|---|---|---|
| 5,036,503 A | 7/1991 | Tomita | |
| 5,392,266 A | 2/1995 | Kobayashi et al. | |
| 5,622,470 A | 4/1997 | Schaefer et al. | |
| 6,141,178 A | 10/2000 | Nakajima et al. | |
| 6,424,603 B1 * | 7/2002 | Matsushima | 369/30.42 |
| 6,493,604 B1 | 12/2002 | Kappel et al. | |
| 6,729,825 B1 | 5/2004 | Saliba et al. | |
| 6,900,960 B2 * | 5/2005 | Gariepy et al. | 360/92.1 |
| 7,486,472 B2 * | 2/2009 | Pollard et al. | 360/92.1 |
| 2010/0080091 A1 | 4/2010 | Compton et al. | |

* cited by examiner

*Primary Examiner* — Allen Heinz
(74) *Attorney, Agent, or Firm* — Dale F. Regelman; Quarles & Brady LLP

(57) ABSTRACT

A method is provided to handle portable cassettes removeably disposed in a data storage library, wherein the method supplies a data storage library comprising a plurality of storage slots, and a plurality of portable cassettes removeably disposed a designated storage slot in a first alignment order, and a pass-through accessor comprising a moveable fixturing apparatus to store portable cassettes, wherein the pass-through accessor is moveably disposed in the data storage library. The method positions the pass-through accessor adjacent an open end of a designated storage slot, and sequentially removes and attaches to the fixturing apparatus a plurality of portable cassettes from the designated storage slot. The method then transports the plurality of portable cassettes to a designated location within the data storage library.

10 Claims, 18 Drawing Sheets

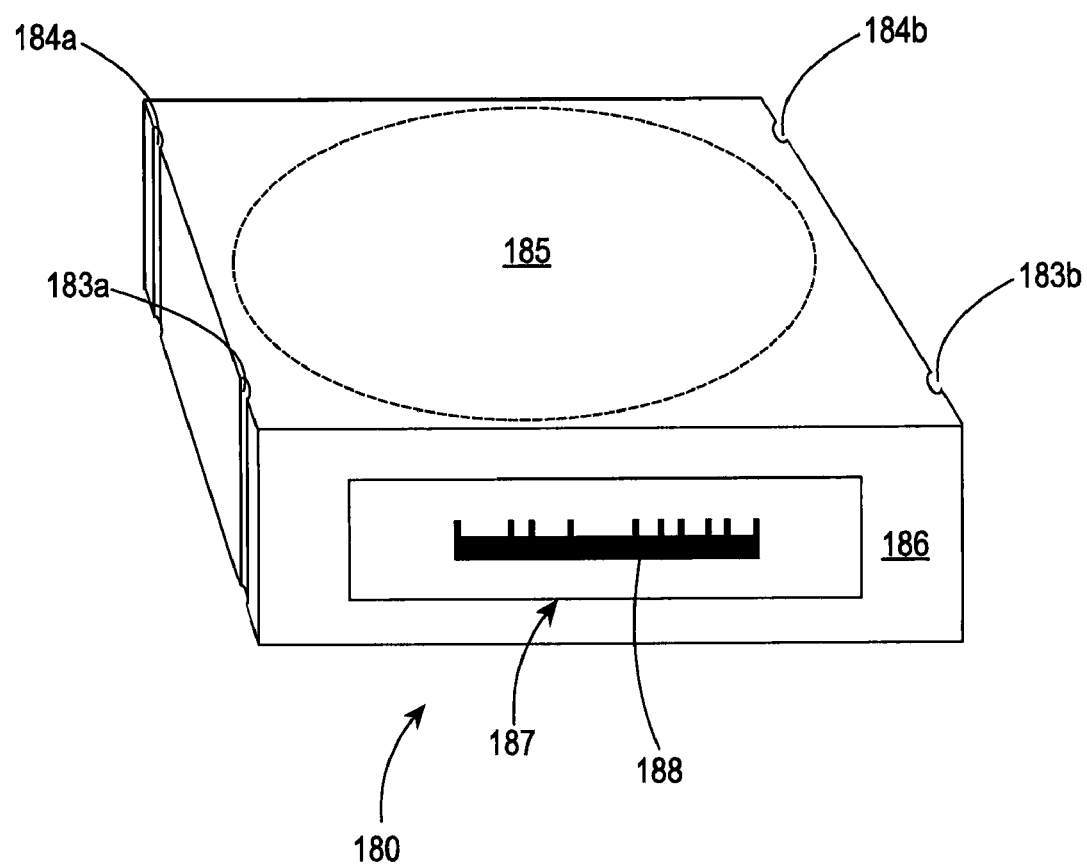

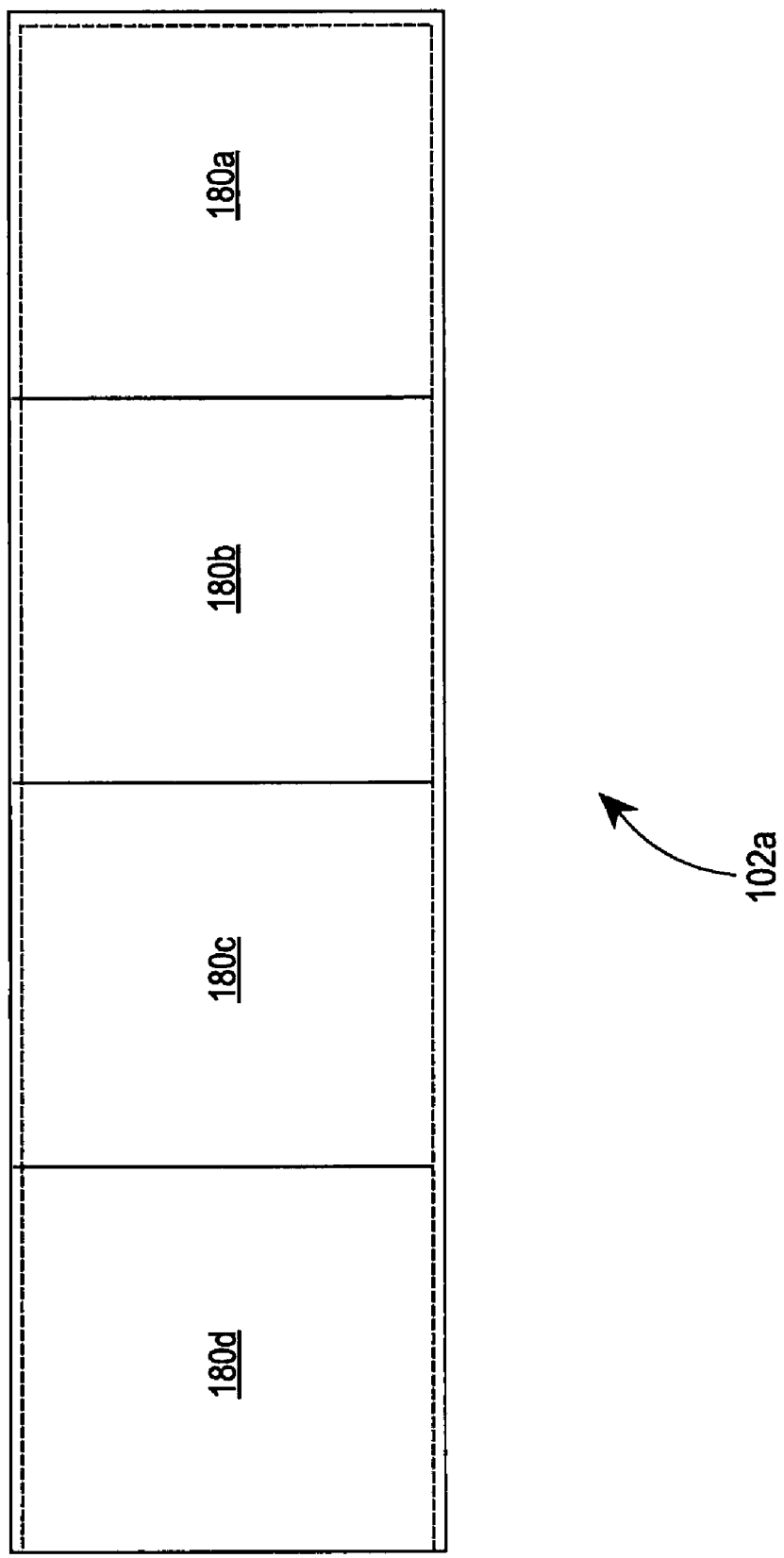

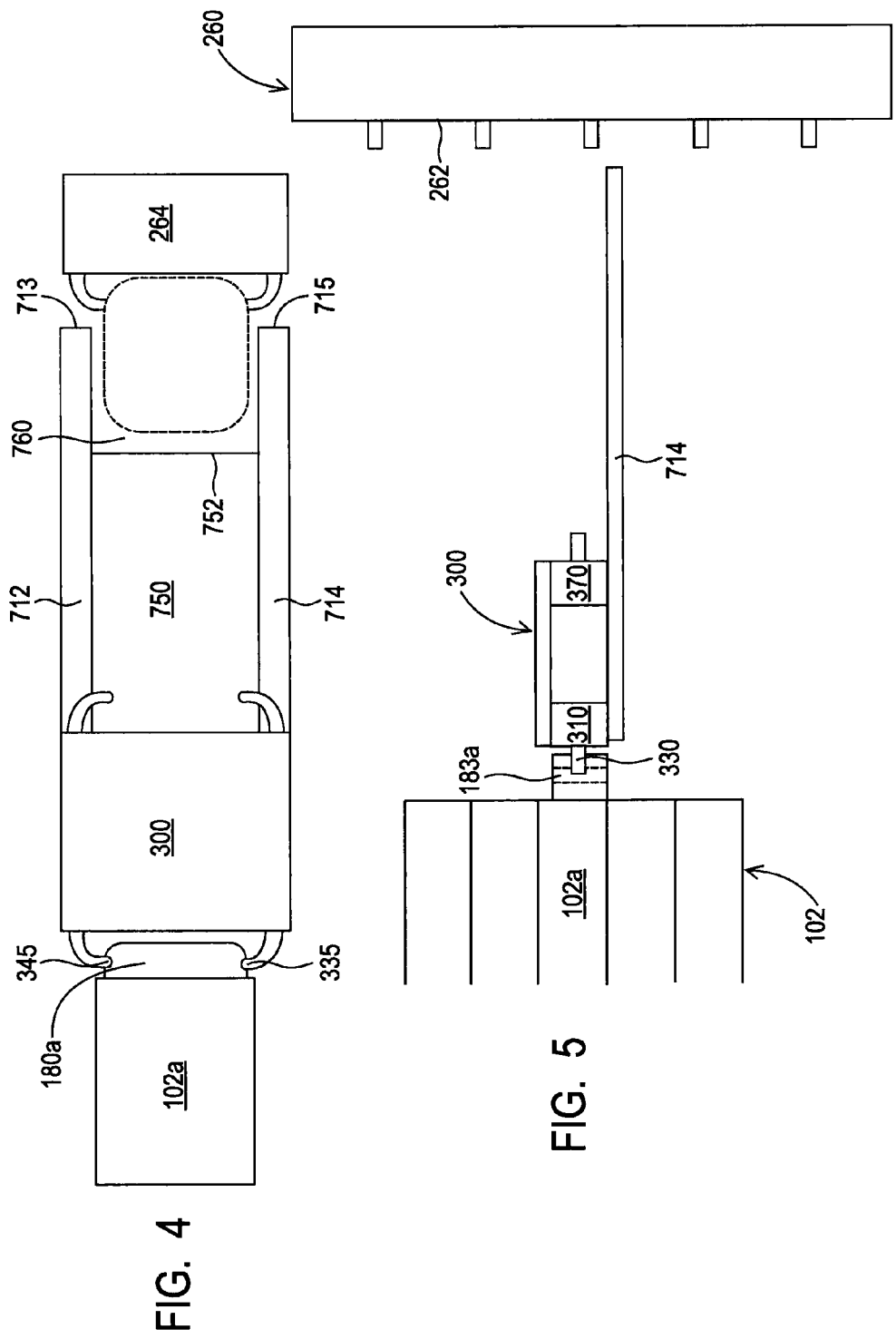

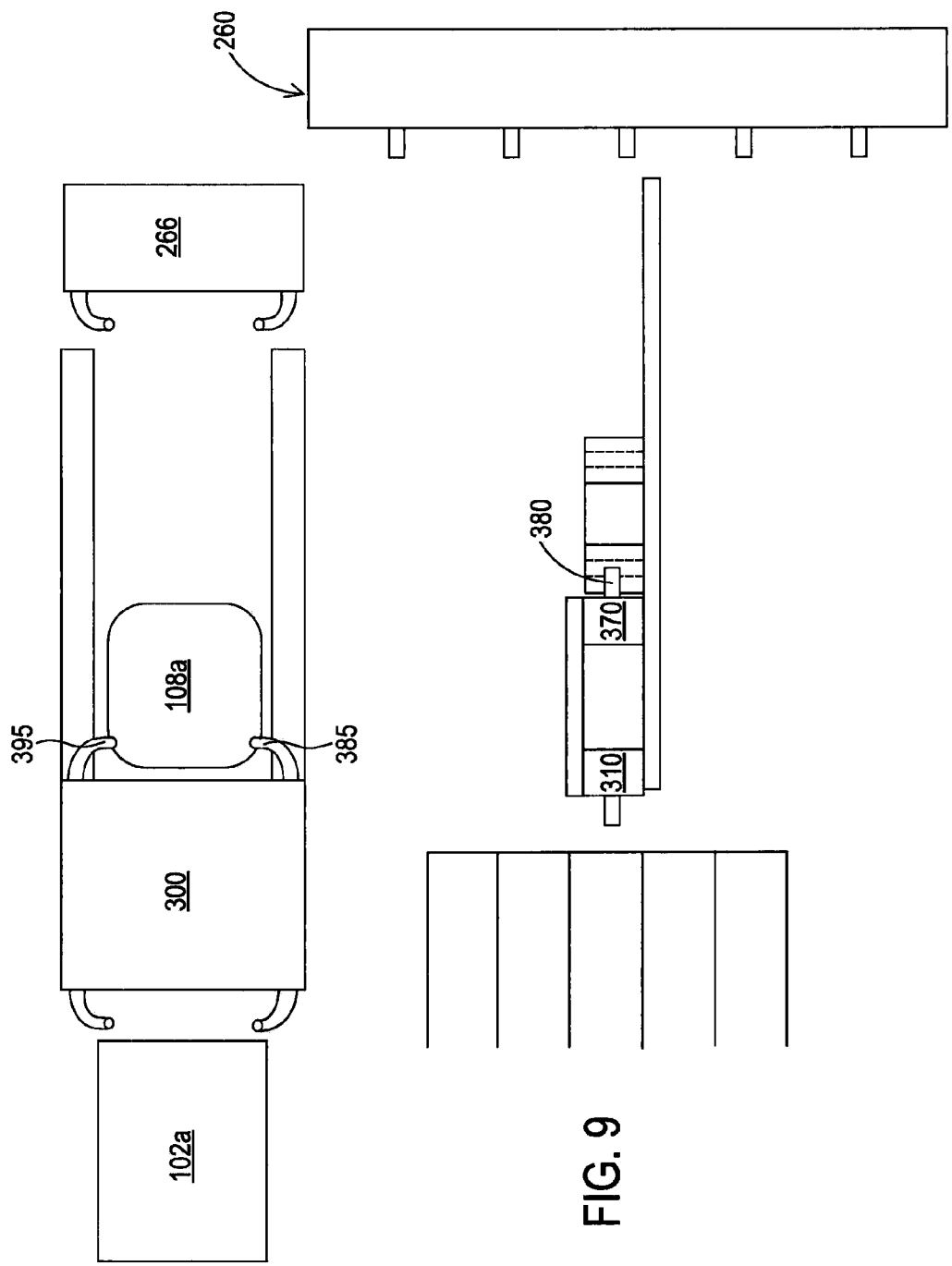

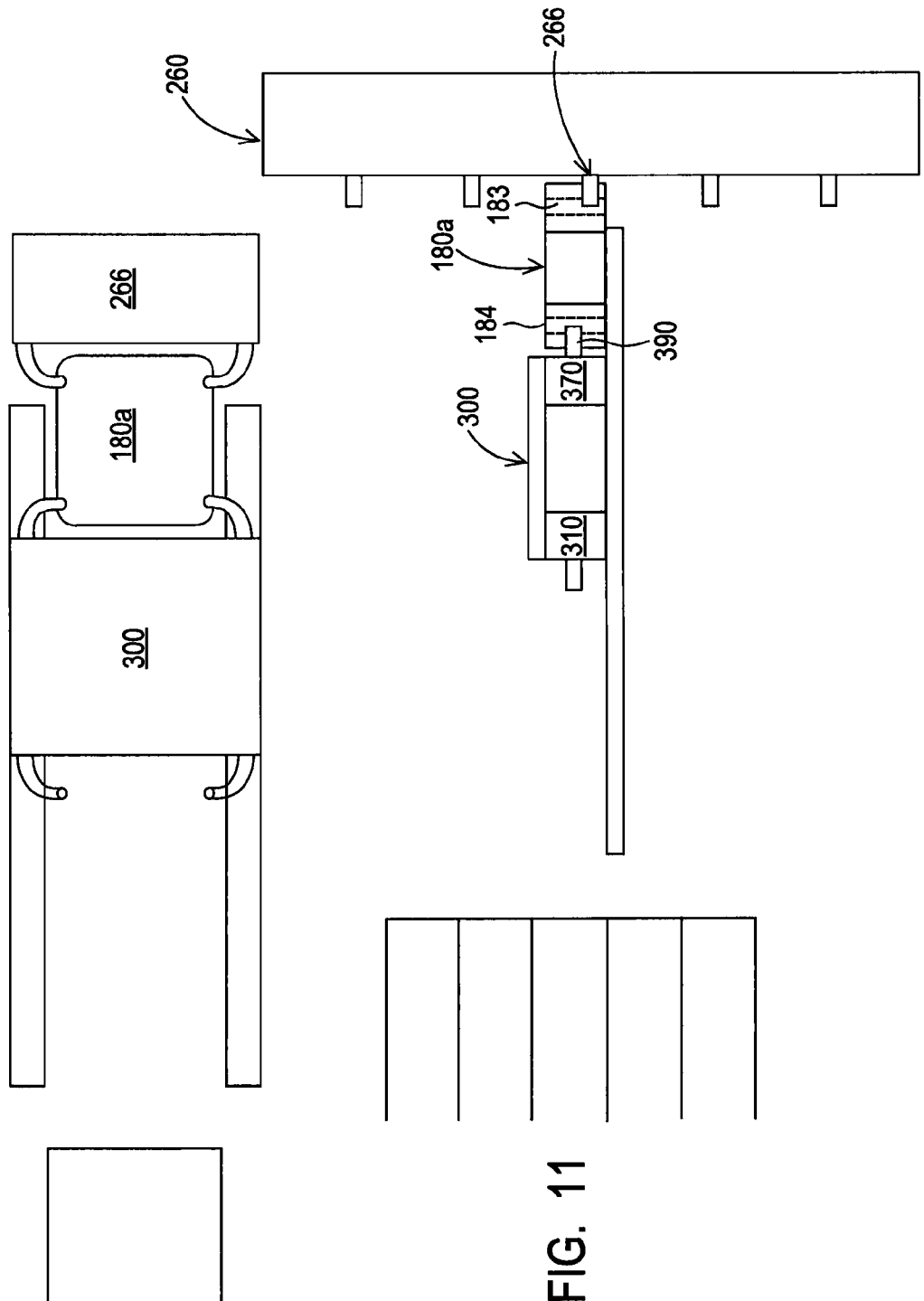

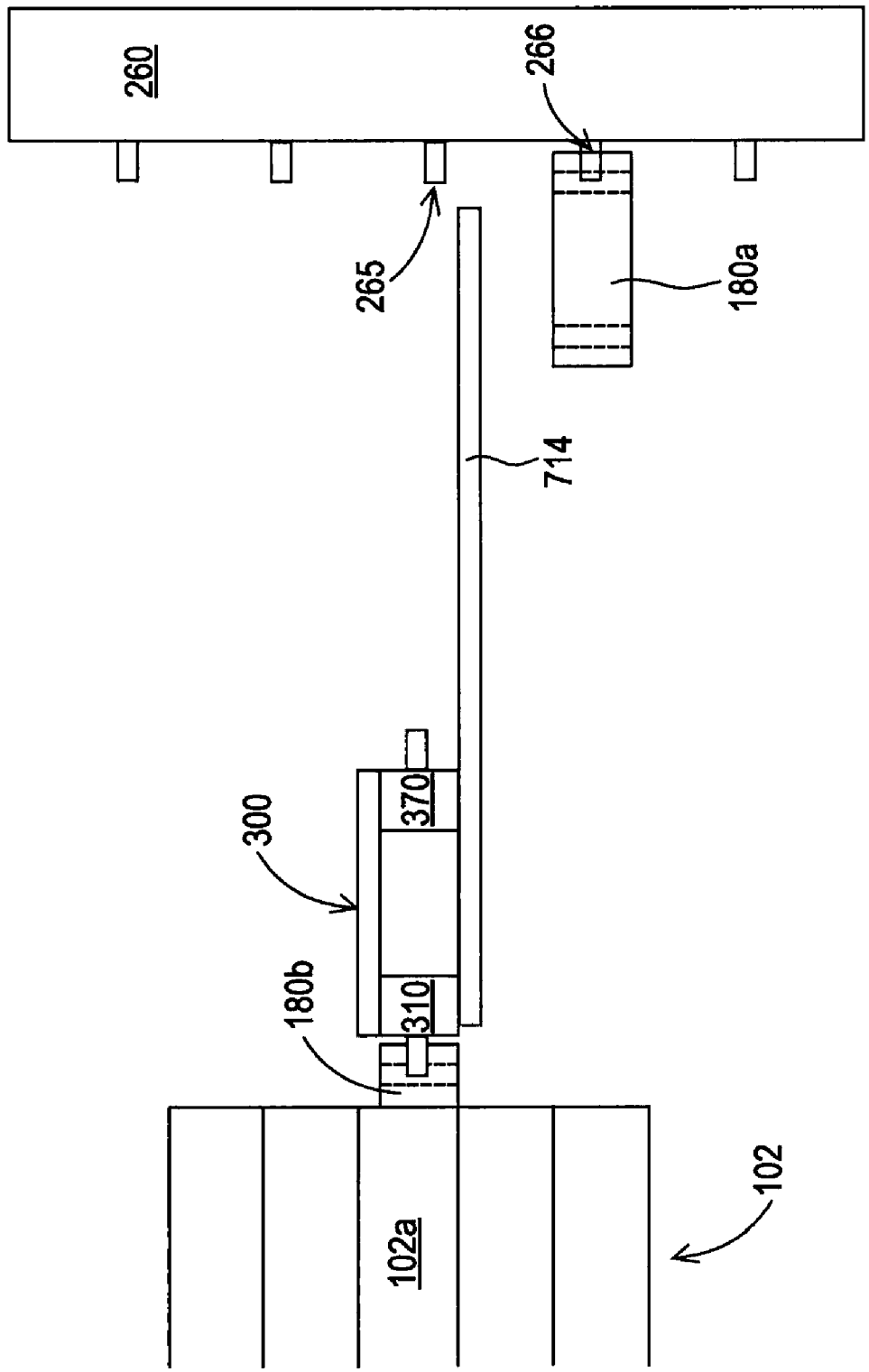

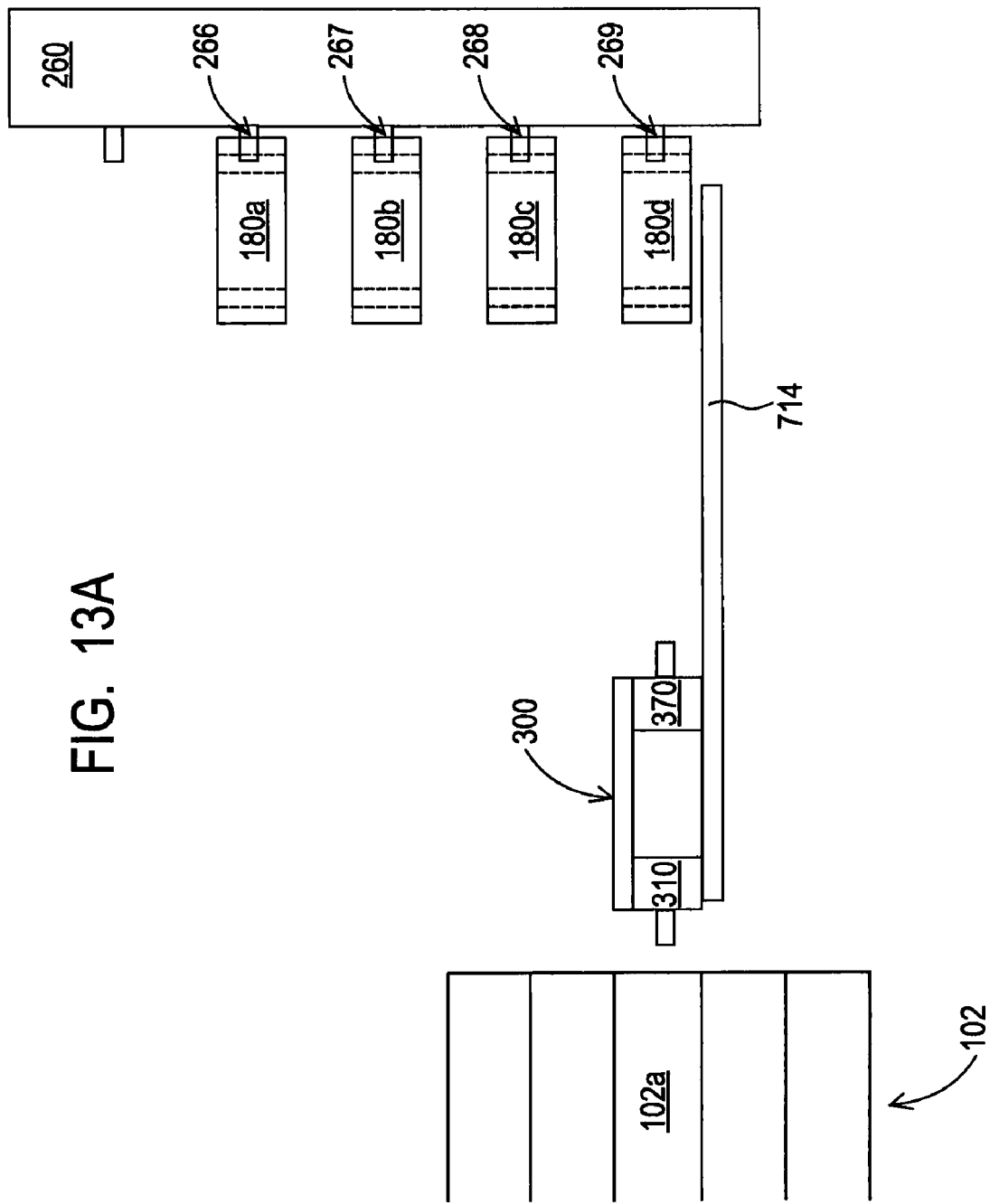

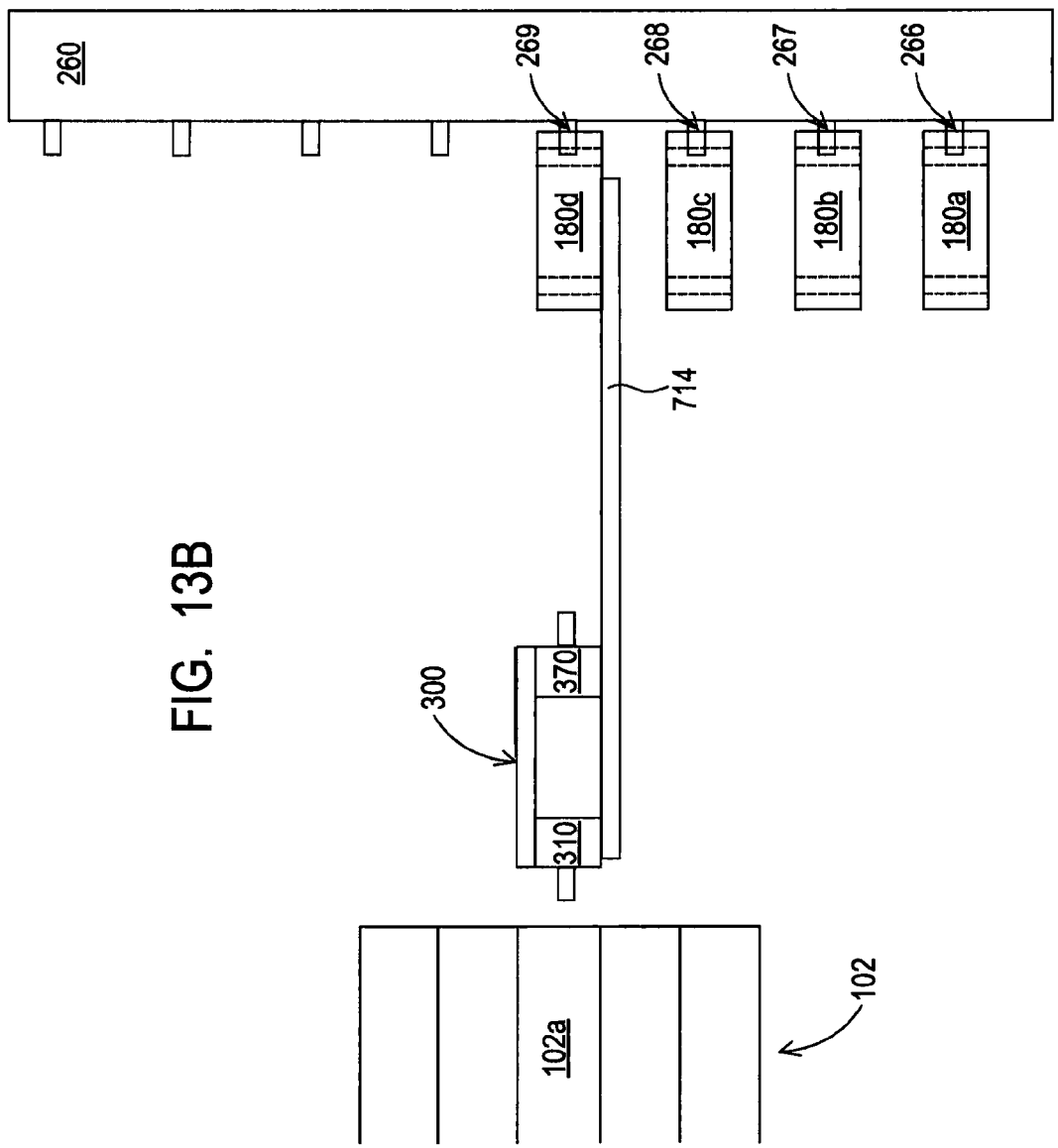

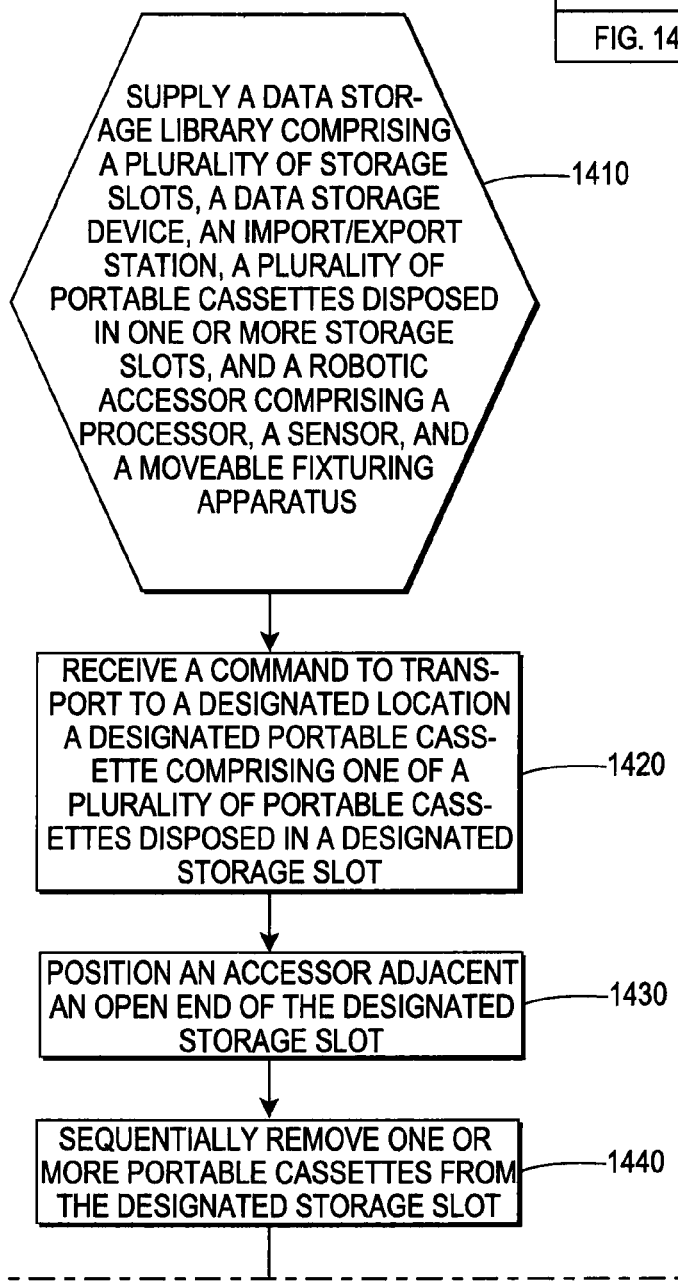

METHOD TO HANDLE PORTABLE CASSETTES REMOVEABLY DISPOSED IN A DATA STORAGE LIBRARY COMPRISING A PASS-THROUGH ACCESSOR

FIELD OF THE INVENTION

This invention relates to a method to handle portable cassettes removeably disposed in a data storage library comprising a pass-through accessor.

BACKGROUND OF THE INVENTION

Computing devices generate information. It is known in the art to store such information using a plurality of data storage cassettes disposed in an automated data storage library comprising a plurality of storage slots. Certain deep cell storage slots are capable of housing a plurality of portable storage cassettes.

SUMMARY OF THE INVENTION

A method is provided to handle portable cassettes removeably disposed in a data storage library. The method supplies a data storage library comprising a plurality of storage slots, and a plurality of portable cassettes removeably disposed a designated storage slot in a first alignment order, and a pass-through accessor comprising a moveable fixturing apparatus to store portable cassettes, wherein the pass-through accessor is moveably disposed in the data storage library.

The method positions the pass-through accessor adjacent an open end of a designated storage slot, and sequentially removes and attaches to the fixturing apparatus a plurality of portable cassettes from the designated storage slot. The method then transports the plurality of portable cassettes to a designated location within the data storage library.

BRIEF DESCRIPTION OF THE DRAWINGS

The invention will be better understood from a reading of the following detailed description taken in conjunction with the drawings in which like reference designators are used to designate like elements, and in which:

FIG. 1C is a perspective view illustrating an identifier disposed on a front portion of the portable cassette of FIG. 1B;

FIG. 1D is a block diagram showing a plurality of portable storage cassettes removeably disposed within a storage slot disposed in the data storage library of FIG. 1A;

FIG. 4 shows a top view of Applicants' gripper assembly disposed at a first end of a set of parallel rails, wherein the gripper assembly comprises two sets of gripping members, and wherein a first set of gripping members are shown releaseably attached to a portable cassette disposed in a storage slot;

FIG. 5 is a side view showing the elements of FIG. 4;

FIG. 8 shows the gripper assembly repositioned at the first end of the set of parallel rails with the second set of gripping members releaseably attached to the portable cassette;

FIG. 9 is a side view showing the elements of FIG. 8;

FIG. 10 shows the portable cassette releaseably attached to Applicants' gripper assembly using the second set of gripping members and to a fixturing assembly disposed on a fixturing apparatus element of Applicants' pass-through accessor;

FIG. 11 is a side view showing the elements of FIG. 10;

FIG. 12B shows the fixturing apparatus 266 of FIG. 11 having been moved downwardly, and the gripper assembly releaseably attached to second portable cassette disposed within the storage slot of FIG. 1D;

FIG. 13A shows the plurality of portable cassettes of FIG. 1D having been removed from storage slot 102(a) and each attached to a different fixturing assembly disposed on fixturing apparatus 260, wherein fixturing apparatus 260 was moved upwardly with each attachment operation;

FIG. 13B shows the plurality of portable cassettes of FIG. 1D having been removed from storage slot 102(a) and each attached to a different fixturing assembly disposed on fixturing apparatus 260, wherein fixturing apparatus 260 was moved downwardly with each attachment operation;

FIG. 14A summarizes the initial steps of Applicants' method;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
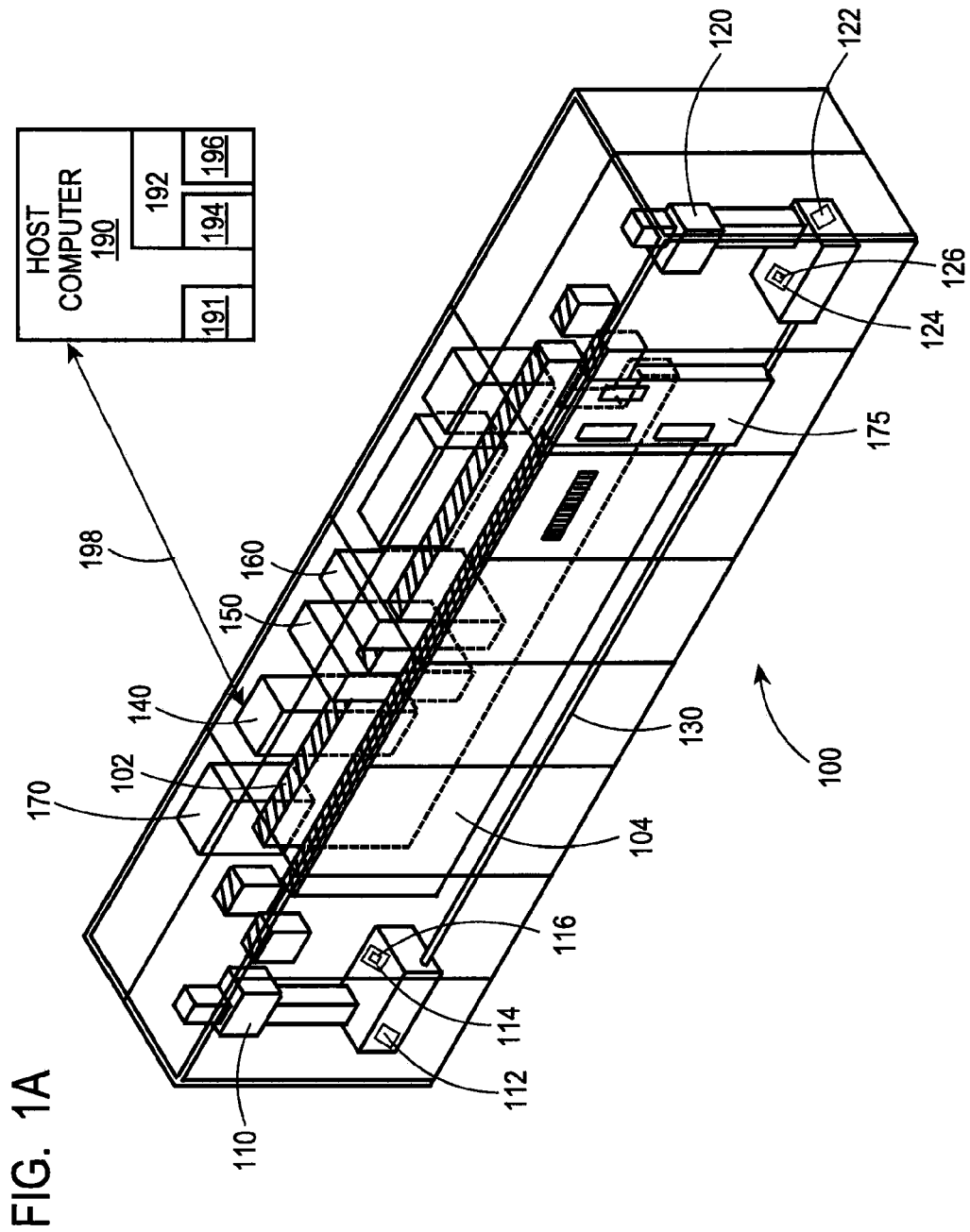
FIG. 1A is a perspective view illustrating an embodiment of Applicants' data storage library.

FIG. 1A shows data storage system 100. System 100 includes storage controller 140, data drives 150 and 160, and DASD 170. System 100 further includes a plurality of portable cassettes removeably disposed in a plurality of storage slots disposed in first storage wall 102 and/or second storage wall 104.

Data storage library 100 further comprises at least one pass-through accessor 110/120 for transporting a designated portable cassette between a storage slot disposed in storage wall 102/104 and data drive 150 or 160. Pass-through accessors 110 and 120 are moveably disposed along rail 130. A plurality of portable cassettes 180 are removeably disposed within Applicants' data storage system, where each cassette comprises an information storage medium disposed therein.

In the illustrated embodiment of FIG. 1A, data storage library 100 further comprises an import/export station 175 New portable cassettes being added data storage library 100 are introduced into the library via import/export station 175. In addition, outdated portable cassettes being removed from the library are removed via import/export station 175.

Figure 1B:
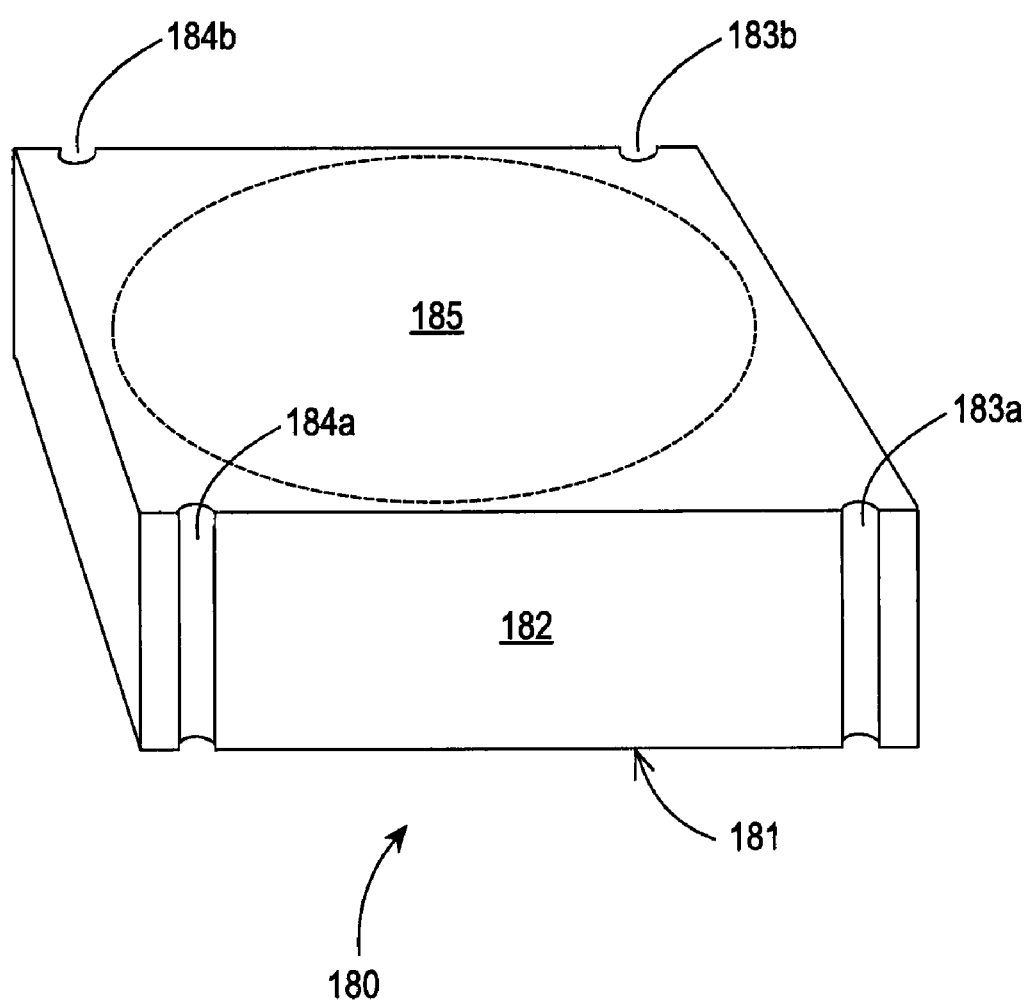
FIG. 1B is a perspective view illustrating Applicants' portable storage cassette.

In the illustrated embodiment of FIG. 1B, each portable cassette 180 comprises a housing 181 and an information storage medium 185 disposed within housing 181. In certain embodiments, the information storage medium 185 is removeably disposed within housing 181. In an illustrated embodiment of FIG. 1B, housing 181 is formed to include fixturing grooves 183a and 184a formed in side 182, and fixturing grooves 183b and 184b formed in an opposing side. In other embodiments, Applicants' housing 181 is formed to include a plurality of fixturing apertures extending inwardly, wherein a plurality of fixturing apertures replace each of the four fixturing grooves.

In the illustrated embodiment of FIG. 1A, data storage system 100 is in communication with host computer 190. As a general matter, host computer 190 comprises a computing device, such as a mainframe, personal computer, workstation, and combinations thereof, including an operating system 194 such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In the illustrated embodiment of FIG. 1A, host computer 190 further comprises instructions 196 encoded in a computer readable medium 192, wherein those instructions comprise computer readable program code to implement Applicants' method using Applicants' pass-through accessor.

Pass-through accessor 110 or 120 can receive a signal from host computer 190 designating one of the plurality of portable cassettes, retrieve that designated portable cassette from a storage slot, transport that designated portable cassette to a designated location, such as and without limitation data drive 150 or 160.

Pass-through accessor 110 and pass-through accessor 120 comprise a processor 112 and 122, respectively, and computer readable medium 114 and 124, respectively, and instructions 116 and 126, respectively encoded in that computer readable medium 114 and 124, respectively. Processor 110 utilizes instructions 116 to implement Applicants' method utilizing pass-through accessor 110. Processor 120 utilizes instructions 126 to implement Applicants' method utilizing pass-through accessor 120 FIG. 1C shows portable cassette comprising an identifier 188. In certain embodiments, that identifier 188 comprises a bar code. In the illustrated embodiment of FIG. 1C, identifier 188 is disposed on a label 187, wherein label 187 is disposed on a front portion of portable cassette 180.

In certain embodiments one or more storage slots of wall of storage slots 102, and/or wall of storage slots 104, can accommodate more than one portable cassette. FIG. ID is a top view showing four portable cassettes, namely portable cassettes 180a, 180b, 180c, and 180d, disposed in one storage slot 102a, wherein storage slot 102a comprises one of a plurality of storage slots disposed in storage wall 102 (FIG. 1A). In the illustrated embodiment of FIG. 1D, portable cassette 180a is disposed adjacent an open end in storage slot 102a.

In certain embodiments, the plurality of portable cassettes 180 removeably disposed within Applicants' data storage system each comprise a magnetic tape data storage medium 185. In certain embodiments, the plurality of portable cassettes 180 removeably disposed within Applicants' data storage system each comprise an optical storage medium 185 disposed therein. In certain embodiments, the plurality of portable cassettes 180 removeably disposed within Applicants' data storage system each comprise an electronic storage medium 185 disposed therein. In certain embodiments, the plurality of portable cassettes 180 removeably disposed within Applicants' data storage system each comprise a holographic storage medium 185 disposed therein.

Figure 2A:
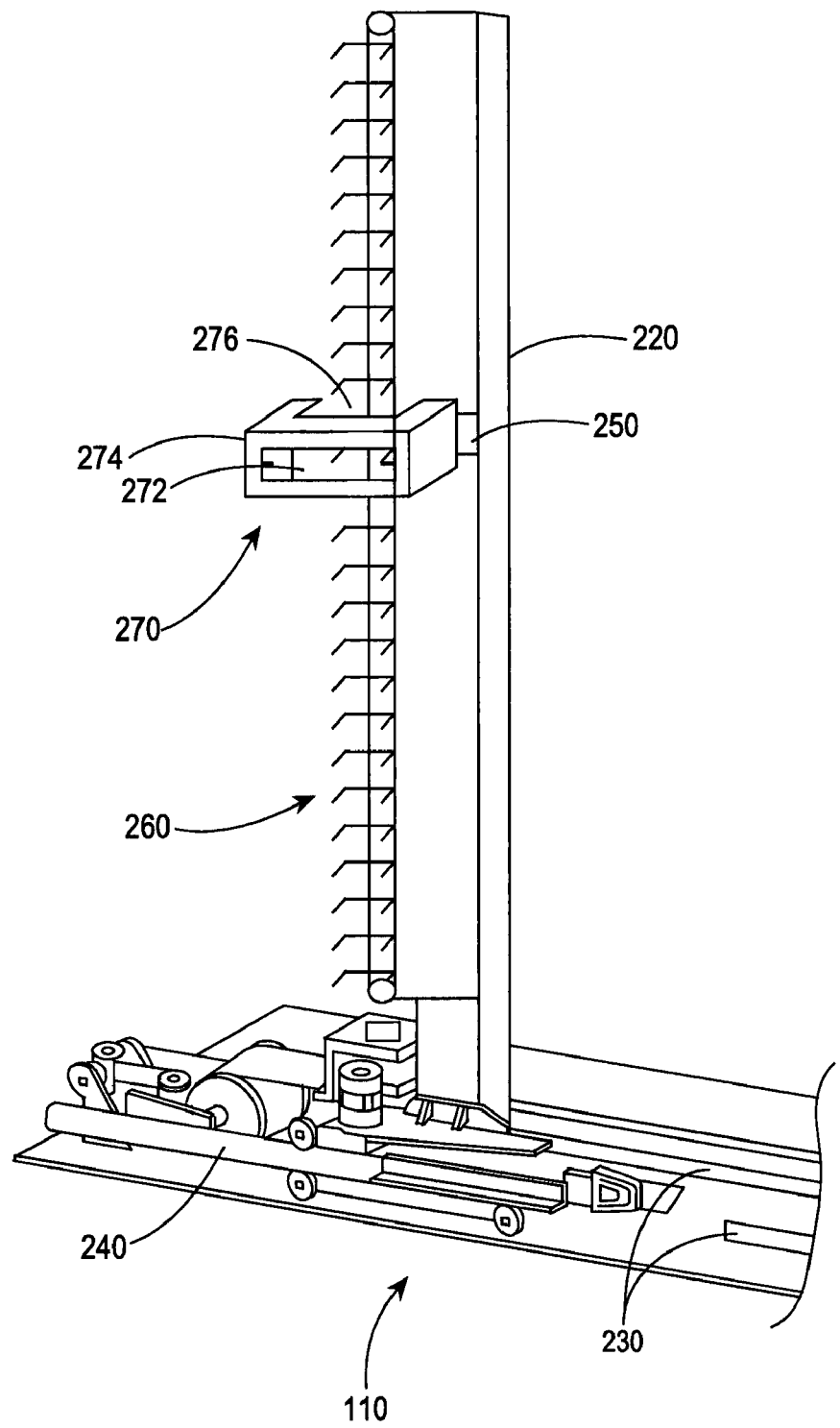
FIG. 2A is a perspective view illustrating Applicants' pass-through accessor moveably disposed in the data storage library of FIG. 1A.
Figure 2B:
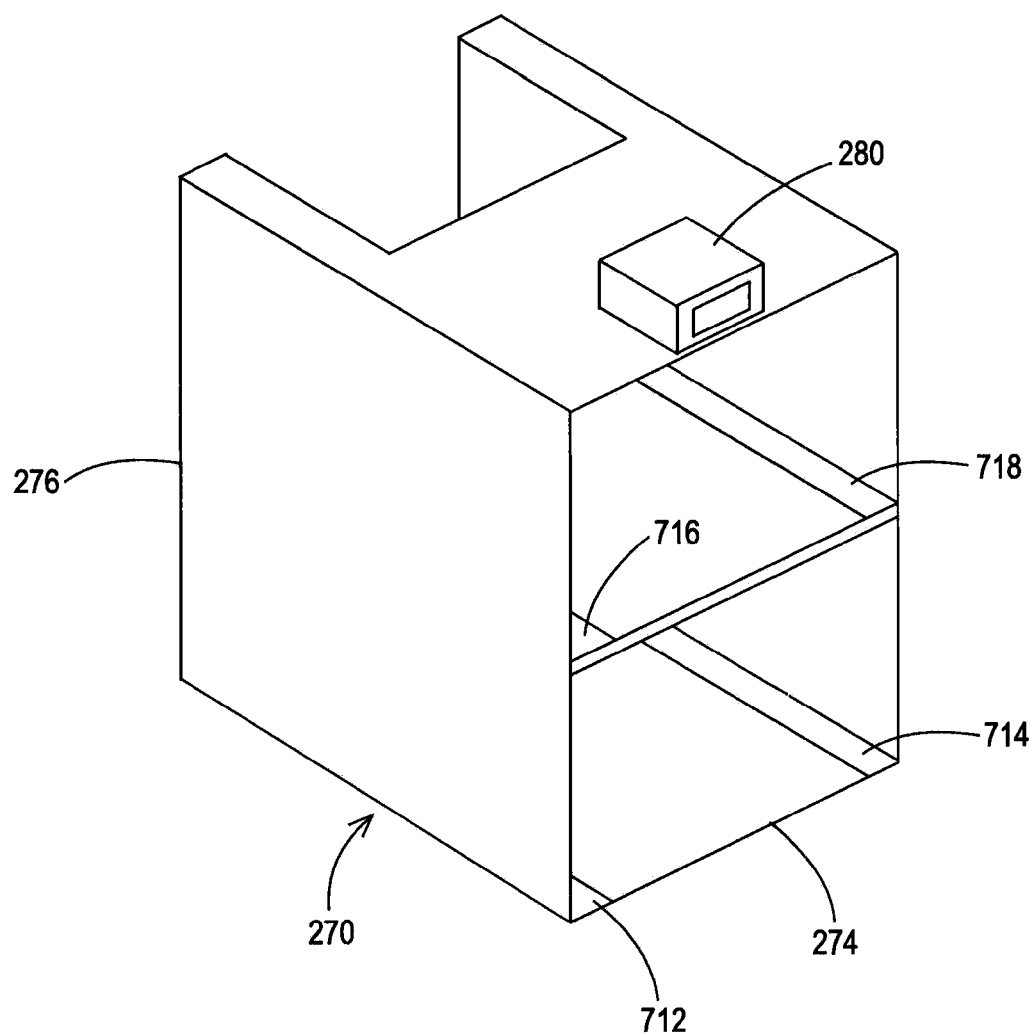
FIG. 2B illustrates a housing element of Applicants' pass-through accessor.

Referring now to FIGS. 1A, 2A, and 2B, Applicants' pass-through accessors 110 and 120 each comprise a vertical pillar 220, a lifting servo section 250 moveably disposed on pillar 220, a fixturing apparatus 260 moveably attached to vertical pillar 220, and housing 270 disposed on lifting servo section 250. In the illustrated embodiment of FIGS. 2A and 2B, housing 270 comprises a "U-shape" defined by front 274 and rear 276. Front 274 is formed to include aperture 272 extending therethrough.

Applicants' pass-through accessors 110 and 120 each further comprise a sensor 280. In certain embodiments, sensor 280 comprises a bar code reader. As those skilled in the art will appreciate, a bar code scanner comprises an electronic device for reading printed bar codes, and comprises a lens and a photo conductor translating optical impulses into electrical ones. In certain embodiments, sensor 280 further comprises decoder circuitry analyzing a barcode's image data provided by the photo conductor and sending bar code's content to processor 112 (FIG. 1A) and/or processor 124 (FIG. 1A).

In certain embodiments, sensor 280 communicates with processor 112 and/or processor 124 via one or more wireless networks utilizing an IEEE 802.11g (WLAN) protocol and/or an IEEE 802.15.3 (Bluetooth) protocol In certain embodiments, sensor 280 utilizes a lasing device as a light source and comprises either a reciprocating mirror or a rotating prism to scan a laser beam back and forth across a bar code. In certain embodiments, a photodiode is used to measure an intensity of the light reflected back from the bar code. In certain embodiments, sensor 280 comprises an array of light sensors. A voltage pattern identical to the pattern in a bar code is generated in sensor 280 by sequentially measuring a voltage across each light sensor in a row.

In certain embodiments, sensor 280 comprises a video camera to capture an image of a bar code. Sensor 280 further comprises digital image processing circuitry to decode the bar code. Fixturing apparatus 260 comprises a plurality of fixturing assemblies attached thereto and extending outwardly therefrom. Fixturing apparatus 260 and housing 270 are rotationally attached to vertical pillar 220. Fixturing apparatus 260 and housing 270 can be rotated to face plurality of storage slots 102 or plurality of storage slots 104.

If a host computer sends a write command and/or a read command (collectively an "I/O command") to data storage library 100, wherein that I/O command designates, for example, portable cassette 180b FIG. 1D. In order to access portable cassette 180b, Applicants' pass-through accessor must first remove portable cassette 180a FIG. 1D from storage slot 102a FIG. 1D, and then portable cassette 180b can be removed from storage slot 102a and transported to a data storage device, such as data storage device 140 or 150.

In order to access and transport portable cassette 180b, Applicants' method first removes portable cassette 180a from storage slot 102a, pulls that portable cassette into housing 270 through aperture 272, pushes the portable cassette 180a outwardly through rear 276, and releaseably attaches portable cassette 180a to a fixturing assembly disposed on fixturing apparatus 260. Pass-through accessor 110 can then retrieve portable cassette 180b from storage slot 102a, and transport data storage cassette 180b to a designated data storage device.

Figure 3A:
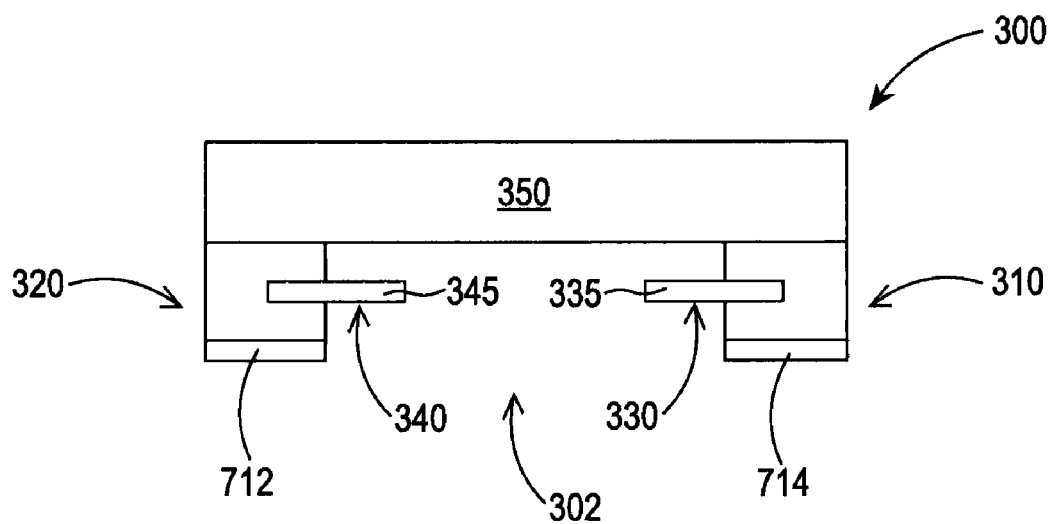
FIG. 3A illustrates one end of Applicants' gripper assembly moveably disposed within Applicants' pass-through accessor.

Referring now to FIG. 3A, Applicants' gripper assembly 300 comprises gripper mechanism 310 and gripper mechanism 320 disposed at a first end 302. Gripper mechanisms 310 and 320 are shown moveably disposed on rails 712 and 714, respectively. Cross-member 350 interconnects gripper mechanism 310 and gripper mechanism 320. Gripper mechanism 310 comprises gripper member 330, wherein gripper member 330 comprises distal end 335. Gripper mechanism 320 comprises gripper member 340, wherein gripper member 340 comprises distal end 345.

Figure 3B:
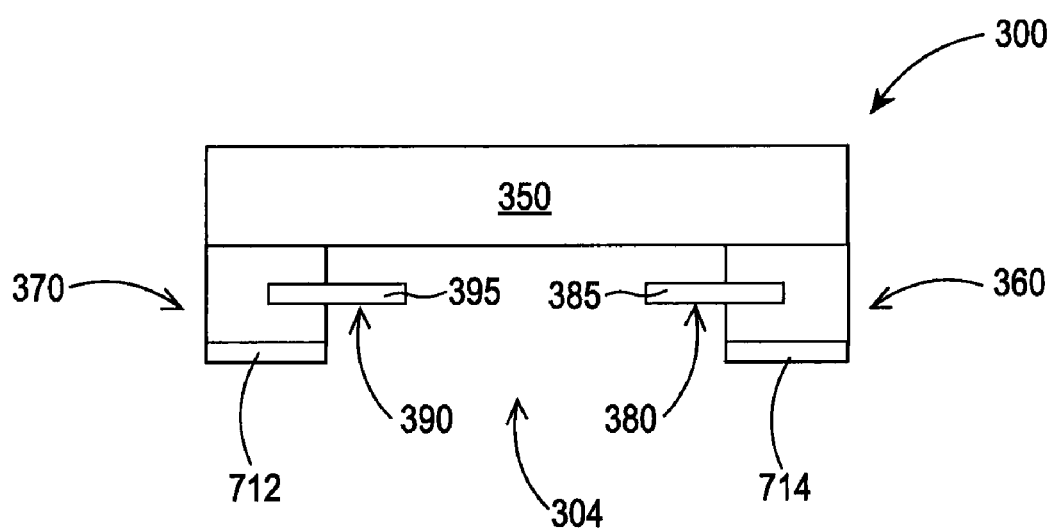
FIG. 3B illustrates an opposing end of Applicants' gripper assembly.

Referring now to FIG. 3B, Applicants' gripper assembly 300 comprises gripper mechanism 360 and gripper mechanism 370 disposed at a second end 304. Gripper mechanisms 370 and 360 are shown moveable disposed on rails 712 and 714, respectively. Gripper mechanism 360 comprises gripper member 380, wherein gripper member 380 comprises distal end 385. Gripper mechanism 370 comprises gripper member 390, wherein gripper member 390 comprises distal end 395.

FIGS. 4, 5, 6, 7, 8, 9, 10, 11, and 12, illustrate Applicants' gripper assembly 300 moveably disposed within Applicants' pass-through accessor 110, and Applicants' method using pass-through accessor 120. Referring once again to FIG. 2B, Applicants' pass-through accessor comprises a housing 270 with two sets of parallel rails disposed within housing 270. A first set of parallel rails comprises rails 712 and 714. A second set of parallel rails comprises rails 716 and 718. For the sake of clarity, FIGS. 4, 5, 6, 7, 8, 9, 10, 11, and 12, show Applicants' gripper mechanism 300 moveably disposed on rails 712 and 714. Applicants' method illustrated in FIGS. 4, 5, 6, 7, 8, 9, 10, 11, and 12, can also be performed using Applicants' gripper mechanism 300 moveably disposed on rails 716 and 718.

Referring to FIG. 4, floor 750 partially connects rail 712 and rail 714. The area of open space 760, defined by end 752 of floor 750, distal end 713 of rail 712, and distal end 715 of rail 714, is greater than the foot print of a portable cassette 180 (shown in dotted lines) attached to, and extending outwardly from, fixturing assembly 264.

Figures 6, 7:
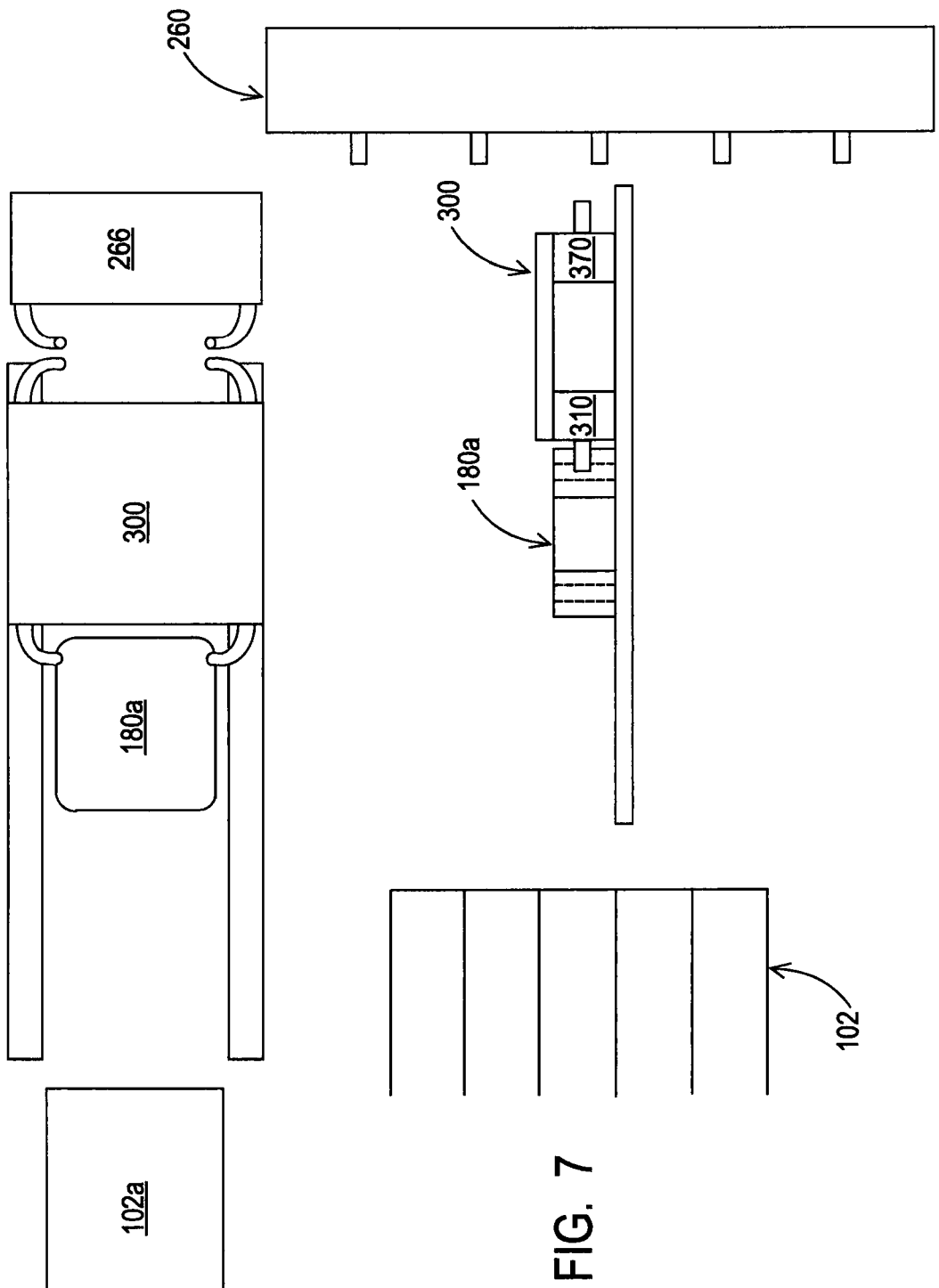
FIG. 6 is a top view showing Applicants' gripper assembly disposed at a second and opposing end of the set of parallel rails of FIG. 4.
FIG. 7 is a side view showing the elements of FIG. 6.

FIGS. 4 and 5 show portable cassette 180a removeably disposed in storage slot 102a. FIGS. 4 and 5 further show distal end 335 of gripping member 330 inserted into fixturing groove 183a (FIGS. 1B, 1C) and distal end 345 of gripping member 340 inserted into fixturing groove 183b (FIGS. 1B, 1C). Referring now to FIG. 6 and 7, gripper assembly 300 pulls portable cassette 180a outwardly from storage slot 102a, through front end 274 (FIGS. 2A, 2B), and into housing 270 (FIGS. 2A, 2B). Referring now to FIGS. 8 and 9, gripper assembly 300 then repositions itself such that distal end 385 of gripping member 380 is inserted into fixturing groove 184a (FIGS. 1B, 1C) and distal end 395 of gripping member 390 is inserted into fixturing groove 184b (FIGS. 1B, 1C). Referring now to FIGS. 10 and 11, gripper assembly 300 pushes portable cassette 180a outwardly through rear 276 (FIGS. 2A, 2B) of housing 270 (FIGS. 2A, 2B) until portable cassette 180a is attached to fixturing assembly 266 disposed on fixturing apparatus 260.

Figure 14B:
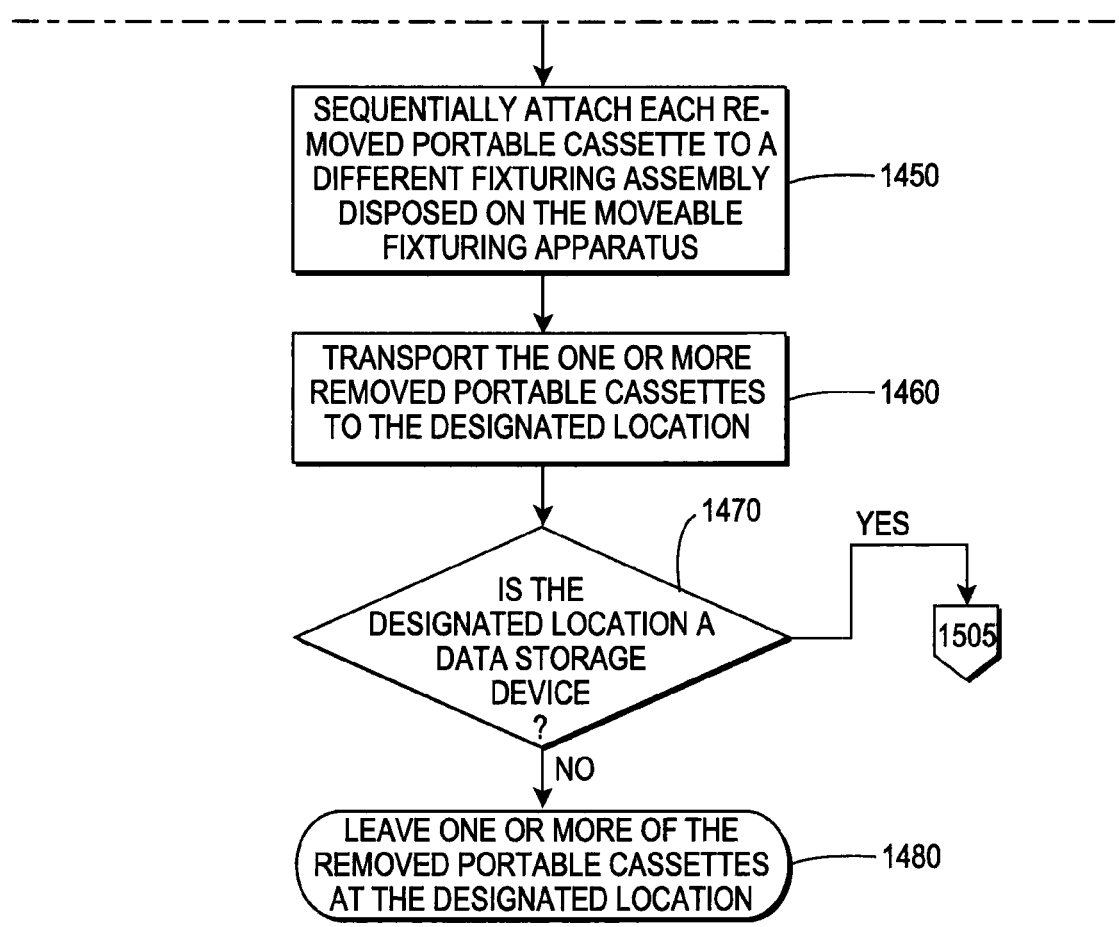
FIG. 14B summarizes certain additional steps of Applicant's method.

Applicants' invention comprises a method to handle a plurality of portable cassettes moveably disposed in an automated data library, such as for example automated data library 100 (FIG. 1A). FIGS. 14A and 14B summarizes the steps of Applicants' method. Referring now to FIG. 14A, in step 1410, the method supplies a data storage library, such as data storage library 100, comprising a plurality of storage slots, an import/export station, a plurality of portable cassettes disposed in one or more of the plurality of storage slots, a data storage device, and a pass-through accessor, such as pass-through accessor 110 and/or 120, comprising a sensor, a processor, and a moveable fixturing apparatus for storing portable cassettes.

In step 1420, the method provides a command to transport to a designated location a designated one of a plurality of portable cassettes removeably disposed in a designated storage slot. Referring once again to FIG. 1 D, the portable cassettes shown disposed in storage slot 102a are disposed in an original arrangement order, wherein portable cassette 180a is disposed adjacent an open end of storage slot 102a. Portable cassette 180b is disposed immediately behind portable cassette 180a in storage slot 102a. Portable cassette 180c is disposed immediately behind portable cassette 180b in storage slot 102a. Portable cassette 180d is disposed immediately behind portable cassette 180c in storage slot 102a.

In certain embodiments, a host computer in communication with the data storage library of step 1410 generates the command of step 1420. In certain embodiments, the command of step 1420 is received by a processor disposed in the pass-through accessor of step 1410. In certain embodiments, the command of step 1420 comprises a read command and/or a write command (collectively an "I/O Command"). In certain embodiments, the command of step 1420 comprises a command to transport the designated portable cassette to the import/export station of step 1410 or to a drive (data storage device).

In step 1430, the method positions the accessor of step 1410 adjacent an open end of the designated storage slot of step 1420. In certain embodiments, step 1430 is performed by a processor disposed in the pass-through accessor of step 1410.

In step 1430, the method sequentially removes one or more portable cassettes from the designated storage slot using the robotic access of step 1410 until the designated storage cassette has been removed. For example, if portable cassette 180b comprises the designated portable cassette, then in step 1430 the method removes portable cassette 180a from storage slot 102a and then removes portable cassette 180b from storage slot 102a. In this example, portable cassettes 180c and 180d would not removed from storage slot 102a.

In certain embodiments, the accessor of step 1410 comprises a vertical pillar comprising a first end and an opposing second end; a lifting servo section, wherein said lifting servo section is moveably disposed on said vertical pillar, and wherein said first end of said vertical pillar is attached to a carriage assembly moveably disposed in said data storage library; a set of parallel rails disposed on said lifting servo section; a gripper assembly, such as gripper assembly 300, moveably disposed on the set of parallel rails, wherein said gripper assembly comprises a first end, an opposing second end, a first gripping member and a second gripping member disposed on a first end, and a third gripping member and a fourth gripping member disposed on an opposing second end.

In certain embodiments, each removal operation of step 1430 comprises attaching a distal end 335 (FIG. 3A) of a first gripping member 330 (FIG. 3A) and a distal end 345 (FIG. 3A) of a second gripping member 340 (FIG. 3A) of a gripping assembly 300 to a first set of fixturing grooves (183a and 184a) formed in the sides of the a portable cassette, pulling by a gripper assembly 300 the portable cassette outwardly from a designated storage slot, through an aperture 272 (FIGS. 2A, 2B) formed in a housing 270 (FIG. 2A, 2B) disposed on a lifting servo section 250 (FIG. 2A), and into the housing. If (N) portable cassettes are disposed in front of the designated portable cassette in the designated storage slot, then the above-recited removal operation is repeated (N+1) times. In certain embodiments, each iteration of step 1430 is illustrated in FIGS. 4, 5, 6, and 7.

Figure 12A:
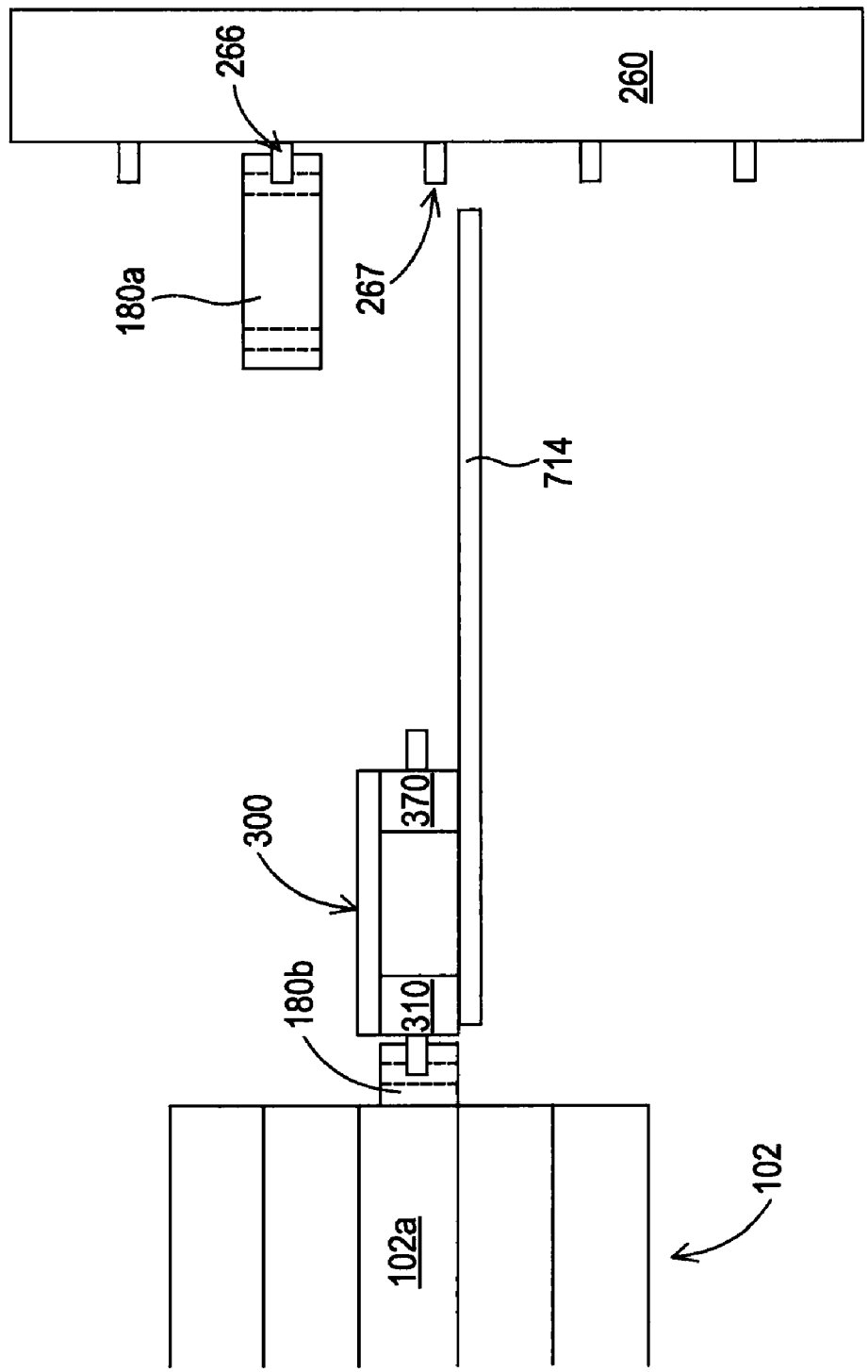
FIG. 12A shows the fixturing apparatus 266 of FIG. 11 having been moved upwardly, and the gripper assembly releaseably attached to second portable cassette disposed within the storage slot of FIG. 1D.

In step 1450, the method sequentially attaches each portable cassette removed in step 1440 to a different fixturing assembly disposed on the moveable fixturing apparatus of step 1410. Steps 1440 and 1450 are interleaved sequentially, meaning that a portable cassette is removed from the designated storage slot in step 1440 and is then attached to a fixturing assembly in step 1450. After attaching the removed portable cassette to a fixturing assembly, the fixturing apparatus is moved upwardly as shown in FIG. 12A, or downwardly as shown in FIG. 12B, to make available another fixturing assembly. The sequence of steps 1440 and 1450 is then repeated until each of the plurality of portable cassettes disposed in the designated storage slot have been removed and stored on a different fixturing assembly disposed on the moveable fixturing apparatus of step 1410.

FIG. 13A shows portable cassettes 180a, 180b, 180c, and 180d, removed from storage slot 102a and attached to a different fixturing assembly of fixturing apparatus 260, wherein after each attachment operation fixturing apparatus 260 was moved upwardly.

In certain embodiments, each attachment operation of step 1450 comprises attaching a distal end 385 (FIG. 3B) of a third gripping member 380(FIG. 3B) and a distal end 395 (FIG. 3B) of a fourth gripping member 390 (FIG. 3B) of a gripping assembly 300 to a second set of fixturing grooves (183b and 184b) formed in the sides of a portable cassette, pushing that portable cassette outwardly through a rear 276 (FIGS. 2A, 2B) of a housing 270 (FIGS. 2A, 2B), and into the distal ends of two gripping members comprising a portion of the moveable fixturing apparatus 260. If (N) portable cassettes are disposed in front of the designated portable cassette in the designated storage slot, then the above-recited attachment operation is repeated (N+1) times. In certain embodiments, each iteration of step 1450 is illustrated in FIGS. 8, 9, 10, and 11.

In certain embodiments all cartridges that have been removed from the slot, but the one that is actually desired, will be put back into the slot before moving the desired cartridge to the appropriate destination.

In another embodiment the temporarily removed cartridges might be kept in the fixturing device and will only be moved back to the source slot, once the desired cartridge has been returned from the target drive, such that all cartridge will be put back at once (while this wouldn't apply to cartridges that got temporarily removed from a slot along with a cartridge that is going to be exported.

In yet another embodiment, methods 1 and 2 might be combined such that temporarily removed cartridges will be kept in the fixturing device "as long as possible" yet only until the referenced desired cartridge has been returned. Yet if more additional cartridges will need to get stored in the fixturing device (from subsequent additional host commands), the temporary cartridges will be returned to their home slot, e.g. on a least recent used base.

In step 1460, the accessor transports the one or more portable cassettes removed from the designated storage slot to the designated location of step 1420. In certain embodiments, step 1430 is performed by a processor disposed in the pass-through accessor of step 1410.

In step 1470, the method determines if the designated location is a data storage device. In certain embodiments, step 1430 is performed by a processor disposed in the pass-through accessor of step 1410. If the method determines in step 1470 that the designated location is not a data storage device, then the method removes one or more of the plurality of portable cassettes attached to the fixturing apparatus of step 1410 and places those one or more portable cassettes at the designated location. In certain embodiments, the designated location comprises an import/export station.

In certain embodiments, the command of step 1420 instructs the pass-through accessor of step 1410 to transport one or more newly-added portable cassettes from an import/export station to one or more designated storage slots. In these embodiments, the accessor travels to the import/export station, attaches each of the one or more newly-added portable cassettes to a different fixturing assembly disposed on the fixturing apparatus, transports those one or more newly-added portable cassettes to one or more storage slots, and inserts each of those one or more newly-added portable cassettes into a designated storage slot disposed in the data storage library.

If the method determines in step 1470 that the designated location is a data storage device, then the method transitions from step 1470 to step 1505, wherein the method positions the pass-through accessor adjacent a data storage device, such as data storage device 150 (FIG. 1A). In certain embodiments, step 1505 is performed by a processor disposed in the pass-through accessor of step 1410.

In step 1510, the pass-through accessor inserts the designated portable cassette of step 1420 into the data storage device of step 1505. In certain embodiments, step 1510 is performed by a processor disposed in the pass-through accessor of step 1410.

In step 1520, the method determines if the data storage library of step 1410 receives a second I/O Command while the first I/O Command of step 1420 is still executing using the first data storage device of step 1530 and the designated portable cassette of step 1420. In certain embodiments, step 1520 is performed by a processor disposed in the accessor of step 1410. In certain embodiments, step 1520 is performed by a library controller disposed in the data storage library of step 1410. In certain embodiments, step 1520 is performed by a host computer in communication with the data storage library of step 1410.

Further I/O commands can be handled similarly, cascading a third and forth cartridge movement, and the like. If the method determines in step 1520 that the data storage library of step 1410 receives a second I/O Command while the first I/O Command of step 1420 is still executing, where that second I/O Command designates a second one of the removed portable cassettes and a second data storage device, then the method transitions from step 1520 to step 1530 wherein, while the first I/O Command is still executing, the method positions the pass-through accessor adjacent a second data storage device, such as data storage device 160.

In certain embodiments, step 1530 is performed by a processor disposed in the accessor of step 1410. In certain embodiments, step 1530 is performed by a library controller disposed in the data storage library of step 1410. In certain embodiments, step 1530 is performed by a host computer in communication with the data storage library of step 1410.

In step 1540, the method, while the first I/O Command is still executing, inserts the second designated portable cassette in the second data storage device. In certain embodiments, step 1540 is performed by a processor disposed in the accessor of step 1410. In certain embodiments, step 1540 is performed by a library controller disposed in the data storage library of step 1410. In certain embodiments, step 1540 is performed by a host computer in communication with the data storage library of step 1410.

In step 1550, after completion of the second I/O Command the method removes the second designated portable cassette from the second data storage device, and attaches the second designated portable cassette to a fixturing assembly attached to the fixturing apparatus of step 1410. In certain embodiments, step 1550 is performed by a processor disposed in the accessor of step 1410. In certain embodiments, step 1550 is performed by a library controller disposed in the data storage library of step 1410. In certain embodiments, step 1550 is performed by a host computer in communication with the data storage library of step 1410.

In step 1555, the method positions the pass-through accessor adjacent the first data storage device. In certain embodiments, step 1555 is performed by a processor disposed in the accessor of step 1410. In certain embodiments, step 1555 is performed by a library controller disposed in the data storage library of step 1410. In certain embodiments, step 1555 is performed by a host computer in communication with the data storage library of step 1410.

In step 1560, after completion of the first I/O Command the method removes the first designated portable cassette from the first data storage device, and attaches the first designated portable cassette to a fixturing assembly attached to the fixturing apparatus of step 1410. In certain embodiments, step 1560 is performed by a processor disposed in the accessor of step 1410. In certain embodiments, step 1560 is performed by a library controller disposed in the data storage library of step 1410. In certain embodiments, step 1560 is performed by a host computer in communication with the data storage library of step 1410.

In certain embodiments, steps 1550 and 1560 are executed in opposite order, depending on which I/O job finishes first.

In step 1570, the method transports the plurality of portable cassettes back to the designated storage slot of step 1420. In certain embodiments, step 1570 is performed by a processor disposed in the accessor of step 1410. In certain embodiments, step 1570 is performed by a library controller disposed in the data storage library of step 1410. In certain embodiments, step 1570 is performed by a host computer in communication with the data storage library of step 1410.

In step 1580, the method determines whether to place the portable cassettes removed in step 1440 back into the designated storage slot in the original alignment order. In certain embodiments, step 1580 is performed by a processor disposed in the accessor of step 1410. In certain embodiments, step 1580 is performed by a library controller disposed in the data storage library of step 1410. In certain embodiments, step 1580 is performed by a host computer in communication with the data storage library of step 1410.

If the method elects to use the original alignment order, then the method transitions from step 1580 to step 1590 wherein the accessor sequentially inserts the previously-removed portable cassettes into the designated storage slot to recreate the original alignment order. In certain embodiments, step 1590 is performed by a processor disposed in the accessor of step 1410. In certain embodiments, step 1590 is performed by a library controller disposed in the data storage library of step 1410. In certain embodiments, step 1590 is performed by a host computer in communication with the data storage library of step 1410.

If the method elects not to use the original alignment order, then the method transitions from step 1580 to step 1595 wherein the accessor sequentially inserts the previously-removed portable cassettes into the designated storage slot in a revised alignment order, such as for example portable cassette 180*b* disposed adjacent an open end of storage slot 102*a*, with portable cassette 180*a* immediately behind portable cassette 180*b*, portable cassette 180*c* immediately behind portable cassette 180*a*, and portable cassette 180*d* immediately behind portable cassette 180*c*.

In certain embodiments, step 1595 is performed by a processor disposed in the accessor of step 1410. In certain embodiments, step 1595 is performed by a library controller disposed in the data storage library of step 1410. In certain embodiments, step 1595 is performed by a host computer in communication with the data storage library of step 1410.

In certain embodiments moving cartridges from multiple slots might be performed by utilizing available slots on the fixturing device. In certain embodiments, the method utilizing Applicants' pass-through accessor described herein is used to import a plurality of storage cassettes into Applicants' data storage system, transport that plurality of portable cassettes to one or more storage slots using the above-described fixturing assembly, and inserting that plurality of portable cassettes into one or more storage slots.

Figure 15:
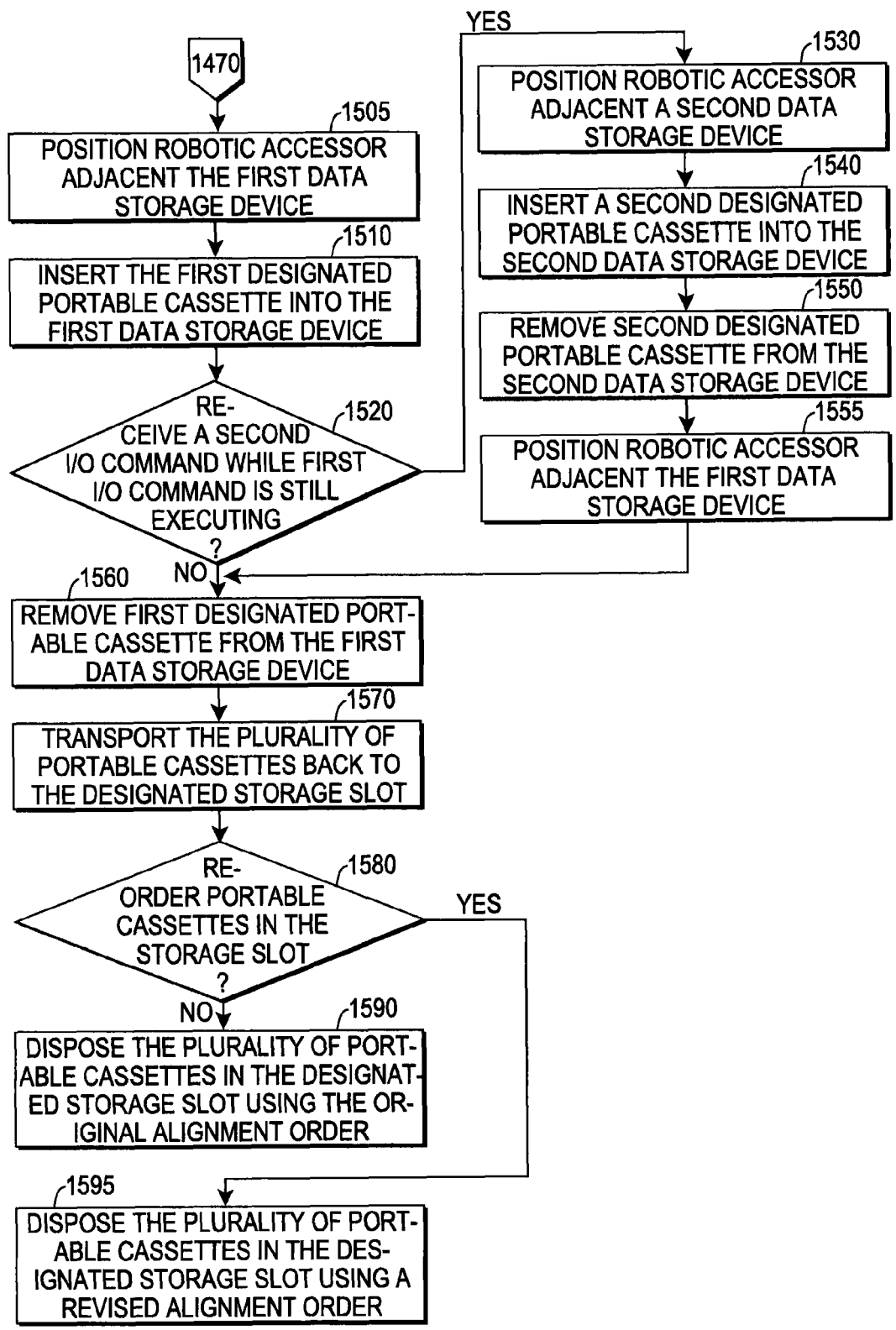
FIG. 15 summarizes certain additional steps in Applicants' method.

In certain embodiments, one or more of the steps of FIGS. 14A, 14B, and 15 may be combined, eliminated, and/or reordered.

In certain embodiments, Applicants' invention includes instructions, such as instructions 196 (FIG. 1) and/or instructions 116 (FIG. 1), and/or instructions 126 (FIG. 1), encoded in a computer readable medium, such as computer readable medium 192 (FIG. 1) and/or 114 (FIG. 1), and/or 124 (FIG. 1), respectively, where those instructions are executed by a processor, such as processor 191 (FIG. 1), and/or 112 (FIG. 1), and/or 122 (FIG. 1), respectively, to perform one or more of steps 1420, 1430, 1440, 1450, 1460, 1470, and/or 1480, recited in FIGS. 1 4A and 14B, and/or one or more of steps 1505, 1510, 1520, 1530, 1540, 1550, 1555, 1560, 1570, 1580, 1590, and/or 1595, recited in FIG. 15.

In other embodiments, Applicants' invention includes instructions residing in a computer program product, where those instructions are executed by a processor external to, or internal to, data storage system 100, to perform one or more of steps 1420, 1430, 1440, 1450, 1460, 1470, and/or 1480, recited in FIGS. 14A and 14B, and/or one or more of steps 1505, 1510, 1520, 1530, 1540, 1550, 1555, 1560, 1570, 1580, 1590, and/or 1595, recited in FIG. 15. In either case, the instructions may be encoded in a computer readable medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to handle portable cassettes moveably disposed in a data storage library, comprising:
   supplying a data storage library comprising a plurality of storage slots, a plurality of portable cassettes removeably disposed in a designated storage slot in a first alignment order;
   supplying a pass-through accessor comprising a moveable fixturing apparatus to store portable cassettes on fixturing assemblies, wherein said pass-through accessor is moveably disposed in said data storage library;
   disposing said pass-through accessor adjacent an open end of a designated storage slot;
   sequentially removing (N) portable cassettes from said designated storage slot, wherein (N) is greater than or equal to 2;
   attaching sequentially each of said (N) portable cassette to a different fixturing assembly disposed on said fixturing apparatus.

2. The method of claim 1, further comprising moving said pass-through accessor with said attached (N) portable cassettes to a designated location within said data storage library.

3. The method of claim 2, further comprising:
   prior to said moving step, replacing (N−1) of said portable cassettes into said designated storage slot;
   moving said pass-through accessor with one attached portable cassette to a designated location in said storage library.

4. The method of claim 2, wherein:
   said data storage library comprises an import/export station; and
   said import/export station comprises said designated location.

5. The method of claim 2, wherein said data storage library is in communication with a host computer, said method further comprising:
   issuing by said host computer a first command to transport a first designated one of said (N) portable cassettes to a first data storage device;
   inserting said first designated portable cassettes into said first data storage device; and
   removing said first designated portable cassette from said first data storage device.

6. The method of claim 5, further comprising:
   receiving after performing said inserting step but before performing said removing step a second command to transport a second designated one of said (N) portable cassettes to a second data storage device;
   before removing said first designated portable cassette from said first data storage device, positioning said pass-through accessor adjacent said second data storage device;
   before removing said first designated portable cassette from said first data storage device, inserting said second designated portable cassette into said second data storage device.

7. The method of claim 6, further comprising:
   before removing said first designated portable cassette from said first data storage device, removing said second designated portable cassette from said second data storage device.

8. The method of claim 7, further comprising positioning said pass-through accessor adjacent said first data storage device before removing said first designated portable cassette from said first data storage device.

9. The method of claim 5, further comprising:
   transporting said (N) portable cassettes to said storage slot;
   sequentially inserting each of said (N) portable cassettes into said storage slot in said first alignment order.

10. The method of claim 5, further comprising:
    transporting said (N) portable cassettes to said storage slot;
    sequentially inserting each of said (N) portable cassettes into said storage slot in a second alignment order, wherein said second alignment order differs from said first alignment order.

* * * * *